United States Patent
Cho et al.

(10) Patent No.: US 10,580,118 B2
(45) Date of Patent: Mar. 3, 2020

(54) DISPLAY DRIVER AND MOBILE ELECTRONIC DEVICE

(71) Applicant: Samsung Electronics Co., Ltd., Suwon-si, Gyeonggi-do (KR)

(72) Inventors: Hwa Hyun Cho, Seoul (KR); Yoon Ho Ko, Seoul (KR); Tae Kon Yu, Hwaseong-si (KR); Jae Youl Lee, Hwaseong-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 14 days.

(21) Appl. No.: 15/968,963

(22) Filed: May 2, 2018

(65) Prior Publication Data
US 2019/0156466 A1    May 23, 2019

(30) Foreign Application Priority Data

Nov. 21, 2017 (KR) .......................... 10-2017-0155545

(51) Int. Cl.
| | | |
|---|---|---|
| *G06T 5/00* | (2006.01) | |
| *G06T 1/60* | (2006.01) | |
| *G09G 3/20* | (2006.01) | |

(52) U.S. Cl.
CPC ............... *G06T 5/006* (2013.01); *G06T 1/60* (2013.01); *G09G 3/2092* (2013.01); *G09G 2310/08* (2013.01); *G09G 2340/14* (2013.01); *G09G 2360/18* (2013.01)

(58) Field of Classification Search
CPC .... G06T 5/006; H04N 9/3179; H04N 9/3182; H04N 9/3185; G09G 2320/0285
See application file for complete search history.

(56) References Cited

U.S. PATENT DOCUMENTS

| | | | | |
|---|---|---|---|---|
| 5,369,450 A | * | 11/1994 | Haseltine | H04N 3/2335 315/368.12 |
| 6,456,339 B1 | * | 9/2002 | Surati | G03B 37/04 348/744 |
| 8,322,863 B1 | * | 12/2012 | Cho | H04N 9/3185 353/70 |
| 8,754,965 B2 | | 6/2014 | Han et al. | |
| 8,872,932 B2 | | 10/2014 | Han | |
| 2006/0139233 A1 | * | 6/2006 | Neale | G06T 5/006 345/1.1 |
| 2015/0379697 A1 | | 12/2015 | Pohl | |
| 2016/0328882 A1 | | 11/2016 | Lee et al. | |

(Continued)

FOREIGN PATENT DOCUMENTS

| | | |
|---|---|---|
| KR | 10-0744937 B1 | 8/2007 |
| KR | 20100001608 A | 1/2010 |

(Continued)

*Primary Examiner* — Jeffery A Brier

(74) *Attorney, Agent, or Firm* — Harness, Dickey & Pierce, P.L.C.

(57) ABSTRACT

A display driver includes an interface circuit configured to receive an input image of a virtual reality (VR) experience from at least one of an application processor (AP) and a graphics processing unit (GPU); a coordinate correction circuit configured to generate corrected coordinates by adjusting input coordinates of pixels included in the input image; and an image generation circuit configured to generate an output image by distorting the input image using the corrected coordinates.

20 Claims, 16 Drawing Sheets

(56) References Cited

U.S. PATENT DOCUMENTS

| | | | | |
|---|---|---|---|---|
| 2017/0076425 A1* | 3/2017 | Folse | ................ | G02B 27/0179 |
| 2017/0316607 A1* | 11/2017 | Khalid | ................ | G06T 19/006 |
| 2017/0347031 A1* | 11/2017 | Ajito | ................ | H04N 5/23212 |
| 2018/0088890 A1* | 3/2018 | Pohl | ................ | G06F 3/1454 |
| 2018/0165878 A1* | 6/2018 | Khan | ................ | G06F 3/012 |

FOREIGN PATENT DOCUMENTS

| | | |
|---|---|---|
| KR | 10-1078928 B1 | 11/2011 |
| KR | 10-1090097 B1 | 12/2011 |

* cited by examiner

DISPLAY DRIVER AND MOBILE ELECTRONIC DEVICE

CROSS-REFERENCE TO RELATED APPLICATION

This application claims benefit of priority to Korean Patent Application No. 10-2017-0155545 filed on Nov. 21, 2017 in the Korean Intellectual Property Office, the disclosure of which is incorporated herein by reference in its entirety.

BACKGROUND

1. Field

At least some example embodiments of the inventive concepts relate to a display driver and addressing image distortion in a display device.

2. Description of Related Art

As virtual reality (VR) devices are being more commonly used, research into technology to provide users with more realistic and vivid VR has been undertaken. VR devices may include a head-mounted display (HMD) device mounted on the head of a user, or the like. VR devices may basically include a function as a display device outputting an image. In a manner different from display devices of the related art, VR devices may display an image through lenses positioned close to the eyes of a user. Therefore, it may be desirable to preventing image distortion caused by such lenses.

SUMMARY

At least some example embodiments of the inventive concepts provide a display driver and a mobile electronic device, reducing or, alternatively, minimizing distortion occurring due to a lens, as well as reducing power consumption and manufacturing costs.

According to at least some example embodiments of the inventive concepts, a display driver includes an interface circuit configured to receive an input image of a virtual reality (VR) experience from at least one of an application processor (AP) and a graphics processing unit (GPU); a coordinate correction circuit configured to generate corrected coordinates by adjusting input coordinates of pixels included in the input image; and an image generation circuit configured to generate an output image by distorting the input image using the corrected coordinates.

According to at least some example embodiments of the inventive concepts, a display device includes an interface circuit configured to receive an input image of a virtual reality (VR) experience in response to a first sync signal; a source driver configured to input an output image, generated from the input image, to a display panel in response to a second sync signal, the first and second sync signals having a same period, the second sync signal being delayed by a first delay time, relative to the first sync signal; and an image generation circuit configured to distort the input image during the first delay time to generate the output image, the output image including, a first region in which the input image is distorted to be displayed, and a second region that surrounds the first region and is to be displayed in black.

According to at least some example embodiments of the inventive concepts, a mobile electronic device includes an application processor (AP) configured to generate an input image to provide a virtual reality (VR) experience; at least one lens configured to be located adjacent to eyes of a user, when the user uses the mobile electronic device to experience the VR experience; a display driver configured to generate an output image through radial distortion of the input image to correct chromatic aberration and pincushion distortion caused by the lens; and a display device including a display panel configured to receive the output image from the display driver and to display the output image.

BRIEF DESCRIPTION OF DRAWINGS

The above and other features and advantages of example embodiments of the inventive concepts will become more apparent by describing in detail example embodiments of the inventive concepts with reference to the attached drawings. The accompanying drawings are intended to depict example embodiments of the inventive concepts and should not be interpreted to limit the intended scope of the claims. The accompanying drawings are not to be considered as drawn to scale unless explicitly noted.

DETAILED DESCRIPTION

Figure 1:
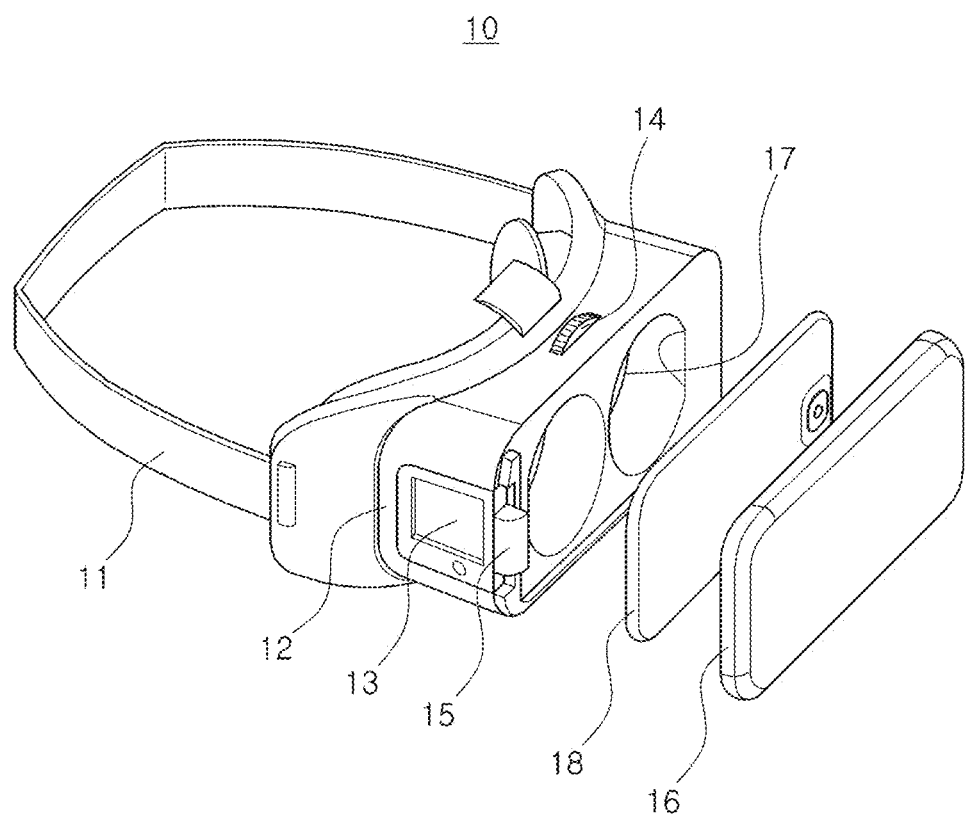
FIGS. 1 and 2 are views of virtual reality (VR) devices according to at least one example embodiment of the inventive concepts.

As is traditional in the field of the inventive concepts, embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions. Also, each block, unit and/or module of the embodiments may be physically separated into two or more interacting and discrete blocks, units and/or modules without departing from the scope of the inventive concepts. Further, the blocks, units and/or modules of the embodiments may be physically combined into more complex blocks, units and/or modules without departing from the scope of the inventive concepts.

Figure 2:
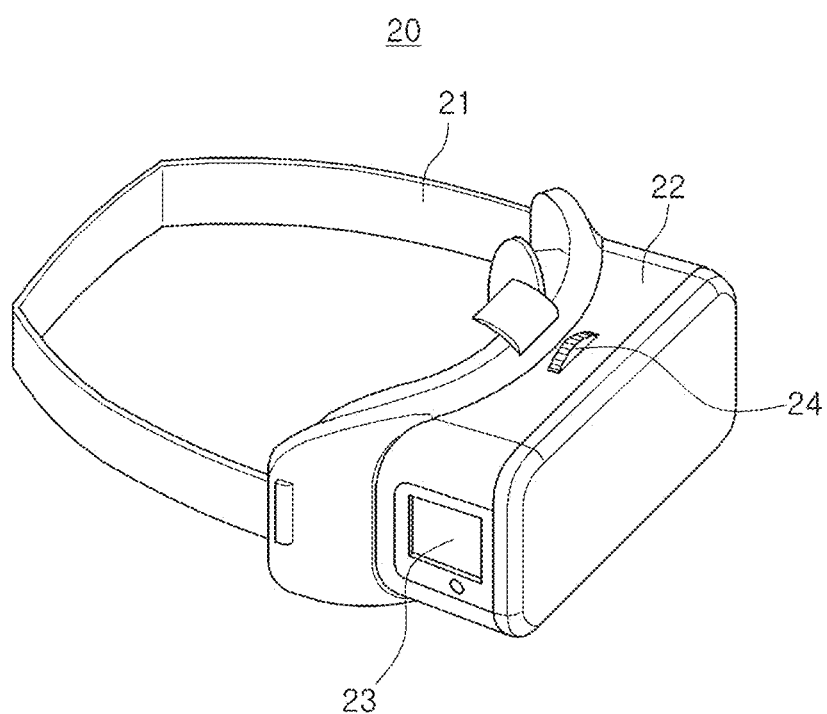

FIGS. 1 and 2 are views of virtual reality (VR) devices according to at least one example embodiment of the inventive concepts.

With reference to FIG. 1, a VR device 10 according to at least one example embodiment of the inventive concepts may be provided as a head-mounted display (HMD) device, mounted on the head of a user when in use. An electronic device 18 to display an image to a user may be mounted on the VR device 10 according to at least one example embodiment of the inventive concepts illustrated in FIG. 1. The electronic device 18 may be mounted in a storage space provided in the VR device 10. In a case in which the electronic device 18 is provided as a device detachable from the VR device 10, a smart device, such as a smartphone, may be employed as the electronic device 18. Alternatively, the electronic device 18 may include at least a display panel and may not be readily detachable from the VR device 10.

The VR device 10 may include a fixing portion 11, a frame 12, operation portions 13 and 14, a connector 15, a cover 16, an optical portion 17, and the like. The fixing portion 11 is provided to mount the VR device 10 on the head of the user and may include a fixing member, such as glasses temples, a helmet, or a band manufactured using an elastic material, such as a strap. The user may fix the VR device 10 by putting his head in the fixing portion 11. A region of the frame 12 may adhere to a peripheral region of eyes of the user. In order to reduce a degree of fatigue of the user, the frame 12 may include an elastic material in a region adhering to the peripheral region of the eyes of the user.

The frame 12 may include a space to accommodate the electronic device 18. The electronic device 18 may be provided as a separate device detachable from the frame 12, as described above. The frame 12 may include the optical portion 17 disposed between the electronic device 18 and the eyes of the user, while the optical portion 17 may include a lens. The electronic device 18 may be provided on a front surface of the optical portion 17, while the cover 16 may be disposed on a rear surface of the electronic device 18.

The connector 15 may be electrically connected to the electronic device 18 to transmit and receive a control signal. In detail, in a case in which the electronic device 18 is provided as a separate device detachable from the frame 12, the connector 15 may be connected to a connector provided in the electronic device 18. According to at least one example embodiment, in a case in which the electronic device 18 is provided as a smart device, the connector 15 may be connected to a connector, using various standards, of a universal serial bus (USB) storage device, a micro-USB, and a lighting terminal, included in the smart device.

The operation portions 13 and 14 may include a touch panel, a mechanical wheel, or the like. The user may perform operations, such as image playback, pausing, moving image viewpoint, and volume adjustment of the electronic device 18 through the operation portions 13 and 14. A wheel 14 may be provided to input a function different from that of a touch panel 13 and may be, for example, provided to adjust a focus of the optical portion 17. The VR device 10 may further include various other operation devices, in addition to the touch panel 13 and the wheel 14.

Referring to FIG. 2 illustrates a VR device 20 according to at least one example embodiment of the inventive concepts may be provided as a stand-alone device providing a VR experience to the user without the need to be connected to a separate electronic device 18. The VR device 20 according to at least one example embodiment of the inventive concepts illustrated in FIG. 2 may include a fixing portion 21, a frame 22, operation portions 23 and 24, and the like, in a manner similar to an example embodiment illustrated in FIG. 1. However, since no separate electronic device is accommodated in the VR device 20, components corresponding to the connector 15 and cover 16 of the VR device 10 illustrated in FIG. 1 may be omitted. A display device displaying an image and an optical portion including the lens may be provided in a space in the frame 22 within the user's eyesight.

An image viewed by the user through the VR device 10 or 20 may be provided as a still image or a video. While the VR experience is being provided, the image viewed by the user may be changed depending on movement of the user wearing the VR devices 10 or 20. The user may view the image through the lens, while the VR experience is being provided. Thus, distortion occurring in the lens should be reduced or, alternatively, minimized to provide a natural image to the user.

When light passes through the lens, light may be refracted depending on curvature and a focal length of the lens. In this case, a chromatic aberration phenomenon in which a degree of refraction varies depending on a wavelength band may occur. For example, a focal point of light having a relatively long wavelength band may be formed farther from the lens than that of light having a relatively short wavelength band. Therefore, when the image is viewed by eyes of the user after the image passes through the lens, quality of the image may be degraded due to chromatic aberration of image data included in each of a red channel, a green channel, and a blue channel.

In addition, a radial distortion phenomenon may occur in the lens. Radial distortion occurring in the lens may include any or both of pincushion distortion and barrel distortion. In a case in which radial distortion occurs, a problem in which the quality of the image is degraded, and the user may experience vertigo may occur.

Figure 3:
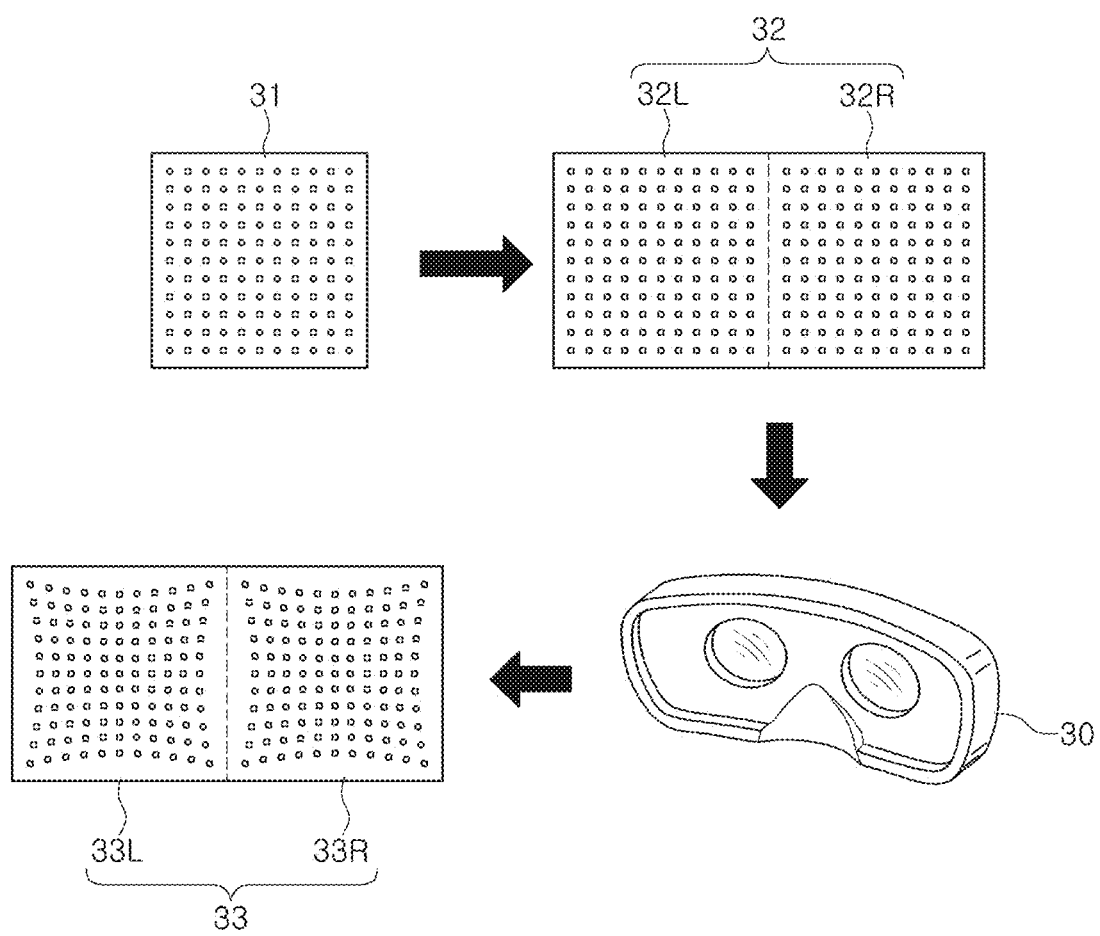
FIGS. 3 and 4 are views illustrating a method of reducing or, alternatively, minimizing distortion occurring in a lens of the VR device according to at least one example embodiment of the inventive concepts.
Figure 4:
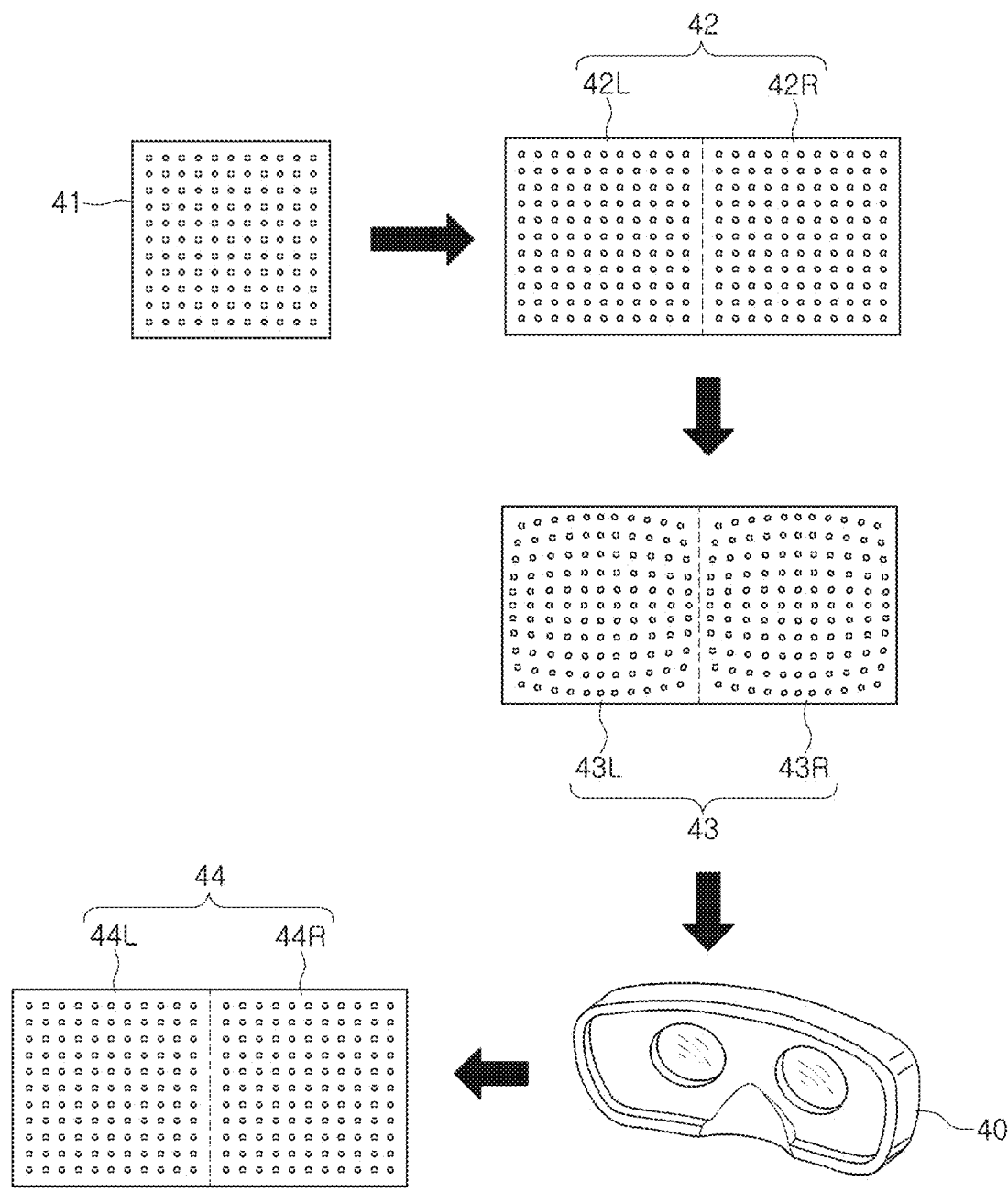

FIGS. 3 and 4 are views illustrating a method of reducing or, alternatively, minimizing distortion occurring in a lens of a VR device according to at least one example embodiment of the inventive concepts.

FIG. 3 is a view illustrating radial distortion occurring in the lens of the VR device. With reference to FIG. 3, a VR image 32 output to a left eye and a right eye of a user may be generated using an original image 31. The VR image 32 may include a left eye image 32L and a right eye image 32R. According to at least some example embodiments, the left eye image 32L may be identical to the right eye image 32R. Alternatively, the left eye image 32L and the right eye image 32R may correspond to left and right viewpoint images of a stereoscopic 3-dimensional (3D) image, and thus, may not be identical.

When the VR image 32 passes through the lens of a VR device 30, radial distortion may occur as illustrated in FIG.

3. An example embodiment illustrated in FIG. 3 illustrates a case in which pincushion distortion occurs in the VR image 32 to be visible to eyes of the user, but barrel distortion may occur in another example embodiment. In other words, the original image 31 may be distorted and displayed as illustrated in FIG. 3 in a VR image 33 passing through the lens to be visible to the eyes of the user. Pincushion distortion may occur in each of a left VR image 33L and a right VR image 33R.

FIG. 4 is a view illustrating a method of reducing or, alternatively, minimizing radial distortion occurring in the lens of the VR device. With reference to FIG. 4, a VR image 42 having a left eye image 42L and a right eye image 42R, output to the left eye and the right eye of the user, using an original image 41, may be generated. In an example embodiment illustrated in FIG. 4, the VR image 42 may be intentionally distorted in consideration of radial distortion occurring in the VR device 40 depending on characteristics of the lens, thereby generating an output image 43.

For example, in an example embodiment illustrated in FIG. 4, when the VR image 42 passes through the lens of the VR device 40, pincushion distortion may occur in an image. In this case, the output image 43 may be generated through intentional barrel distortion of the VR image 42 to offset pincushion distortion. When the output image 43 passes through the lens of the VR device 40, pincushion distortion may occur, thus resulting in a VR image 44 having a left eye image 44L and a right eye image 44R. Thus, radial distortion may not occur in the VR image 44 visible to the eyes of the user.

As illustrated above, an image processing process to correct radial distortion occurring in the VR image 42 may be performed in an application processor (AP) or in a graphics processing unit (GPU). In other words, a display device may only perform a function of receiving the output image 43 generated in the AP or the GPU to be output. However, in this case, a high-performance AP or GPU is required, which may cause an increase in manufacturing costs thereof. In addition, power consumption of the VR device 40 may be increased, so that battery lifetime of VR devices 10 and 20 may be reduced, or computation quantity of the AP or the GPU may be increased, thereby resulting in increased heat generation.

According to at least one example embodiment, the image processing process to correct radial distortion and/or chromatic aberration occurring in the lens of the VR device 40 may be performed in a display driver. In addition, in order to reduce computation quantity of the image processing process, coordinates of a pixel may be converted into polar coordinates to be operated, thereby reducing computation quantity burden of the display driver. The image processing process may be performed using an on-the-fly method, thereby reducing or, alternatively, minimizing required memory capacity. Therefore, an image distortion problem occurring in the lens of the VR device 40 may be solved without an increase in manufacturing costs, power consumption, or heat generation.

Figure 5:
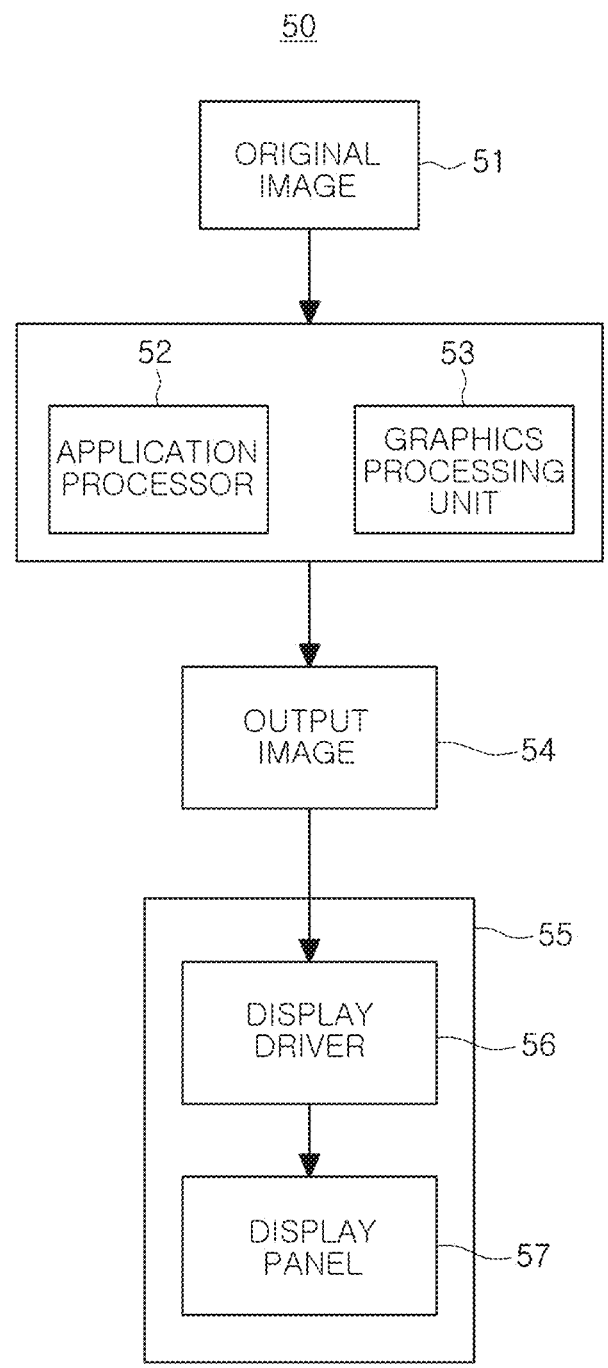
FIGS. 5 and 6 are flow charts illustrating an operation of a mobile electronic device according to at least one example embodiment of the inventive concepts.
Figure 6:
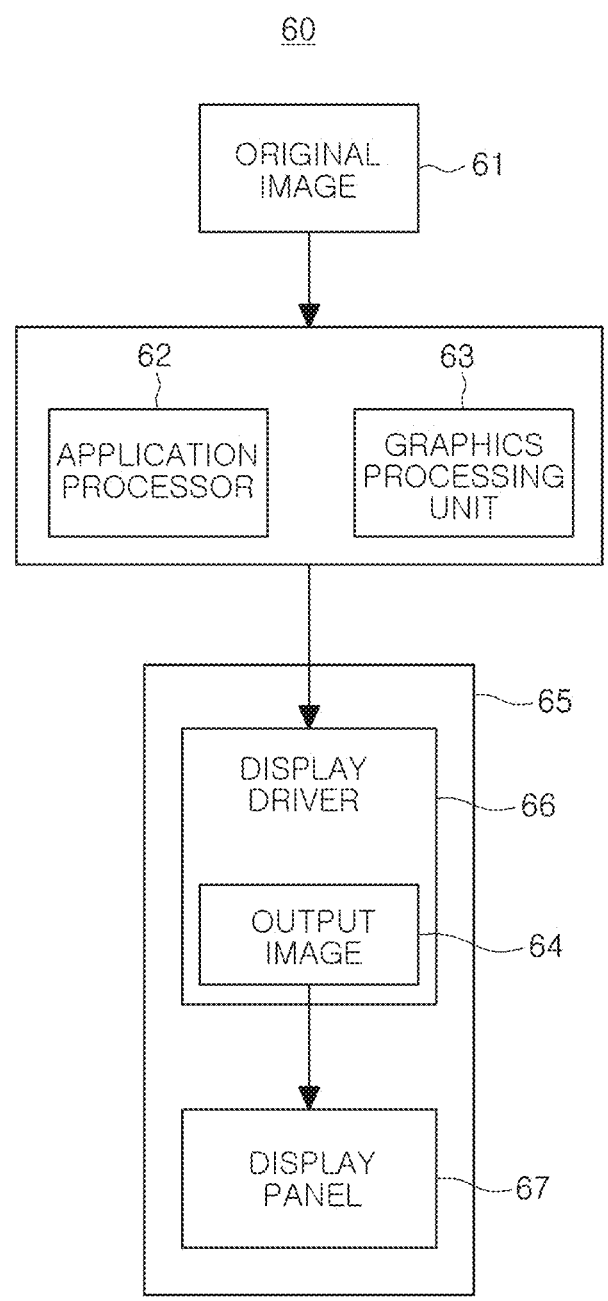

FIGS. 5 and 6 are views illustrating an operation of a mobile electronic device according to at least one example embodiment of the inventive concepts.

In the case of a VR device 50 according to at least one example embodiment of the inventive concepts illustrated in FIG. 5, an AP 52 and/or a GPU 53 may generate an output image 54 using an original image 51. The output image 54 may include a left eye image and a right eye image, visible to a left eye and a right eye of a user, respectively. The output image 54 may be transmitted to a display device 55 through an interface to transmit graphics, or the like.

A display driver 56 may display the output image 54, having been received, on a display panel 57. The output image 54 displayed on the display panel 57 may include the left eye image and the right eye image, visible to the left eye and the right eye of the user, respectively, through a lens of the VR device 50. In this case, a problem, such as radial distortion and chromatic aberration, may occur in a VR image visible to the user, depending on curvature and a focal length of the lens of the VR device 50.

In an example embodiment illustrated in FIG. 5, an image processing process to solve a problem, such as radial distortion and chromatic aberration appearing in the VR image, may be performed in the AP 52 and/or the GPU 53. Therefore, a problem, such as an increase in manufacturing costs or power consumption of the VR device 50, may occur.

Subsequently, in the case of a VR device 60 according to at least one example embodiment of the inventive concepts illustrated in FIG. 6, an AP 62 and/or a GPU 63 may transmit an original image 61 to a display device 65 as an input image. According to at least one example embodiment, the AP 62 and/or the GPU 63 may transmit the original image 61 to the display device 65 as an input image or may lower resolution of the original image 61 to be transmitted to the display device 65 as an input image. In another example embodiment, the AP 62 and/or the GPU 63 may generate a VR image having a left eye image and a right eye image output to a left eye and a right eye of a user, using the original image 61 and may transmit the VR image to the display device 65 as an input image.

A display driver 66 may apply at least one image process to the input image, thereby generating an output image 64. According to at least one example embodiment, radial distortion and chromatic aberration expected to occur in the lens of the VR device 60 may be compensated for in advance by the at least one image process. In addition, According to at least one example embodiment, resolution of an input image may be adjusted by the at least one image process. In this case, resolution of the output image 64 may be higher than that of the input image.

According to at least one example embodiment, the display driver 66 may adjust coordinates of respective pixels included in the input image, thereby intentionally causing distortion in the input image. As described above, in a lens of the VR device 60, radial distortion may occur. According to at least one example embodiment, barrel distortion or pincushion distortion may occur. In a case in which barrel distortion occurs in the lens of the VR device 60, the display driver 66 may intentionally generate pincushion distortion in the input image to generate the output image 64, thereby offsetting barrel distortion occurring in the lens of the VR device 60. In a case in which pincushion distortion occurs in the lens of the VR device 60, the display driver 66 may intentionally generate barrel distortion in the input image to generate the output image 64, thereby offsetting pincushion distortion occurring in the lens of the VR device 60.

Chromatic aberration occurring in the lens of the VR device 60 may be generated in such a manner that data of a red channel is displayed closer to a central portion of an image than is data of a blue channel, when image data corresponding to each pixel is divided into a red channel, a green channel, and a blue channel. Thus, the display driver 66 may correct chromatic aberration occurring in the lens of the VR device 60 in advance in such a manner that a desired or, alternatively, predetermined offset is added to the data of the red channel of the input image based on the central portion of the image and subtracted from the data of the blue channel of the input image, based on the central portion of the image. In this case, the central portion of the image may be defined as a central portion of the input image.

At least some or, alternatively, an entirety of radial distortion and chromatic aberration, occurring in the lens of the VR device 60, may be corrected based on the central portion of the image, visible to eyes of the user. Thus, according to at least some example embodiments of the inventive concepts, coordinates of respective pixels included in the input image may be adjusted based on the central portion of the input image, thereby correcting radial distortion and chromatic aberration, occurring in the lens of the VR device 60, together. Therefore, a computation quantity of the display driver 66 may be reduced thus resulting in lower power consumption, a lower computational burden (e.g., for an AP and/or GPU), and less heat generation. Further, a buffer included in the display driver 66 may be used, thereby reducing or, alternatively, minimizing an increase in manufacturing costs.

According to at least one example embodiment, the display driver 66 may only apply the at least one image process to a portion of pixels included in the input image received from the AP 62 and/or the GPU 63. For example, radial distortion occurring in the lens of the VR device 60 may not appear in pixels disposed adjacent to the central portion of the input image. A degree of radial distortion may be increased in pixels disposed relatively distant from the central portion of the input image. The display driver 66 may only apply an image process to correct radial distortion and chromatic aberration to a portion of the pixels disposed relatively distant from the central portion of the input image, thereby reducing computational quantity.

The input image to provide a VR experience may be divided in frame units. The display driver 66 may adjust coordinates of all pixels included in a single frame of the input image, thereby applying the image process to correct radial distortion and chromatic aberration. When the image process is completed, the display driver 66 may compare the input image with the output image 64 to find pixels, coordinates of which have not been changed despite the image process, and may define the pixels as an overlap region. The display driver 66 may only apply the image process to correct radial distortion and chromatic aberration to pixels not included in the overlap region, in terms of subsequent frames of the input image. Thus, computation quantity of the display driver 66, as well as power consumption may be reduced.

Figure 7:
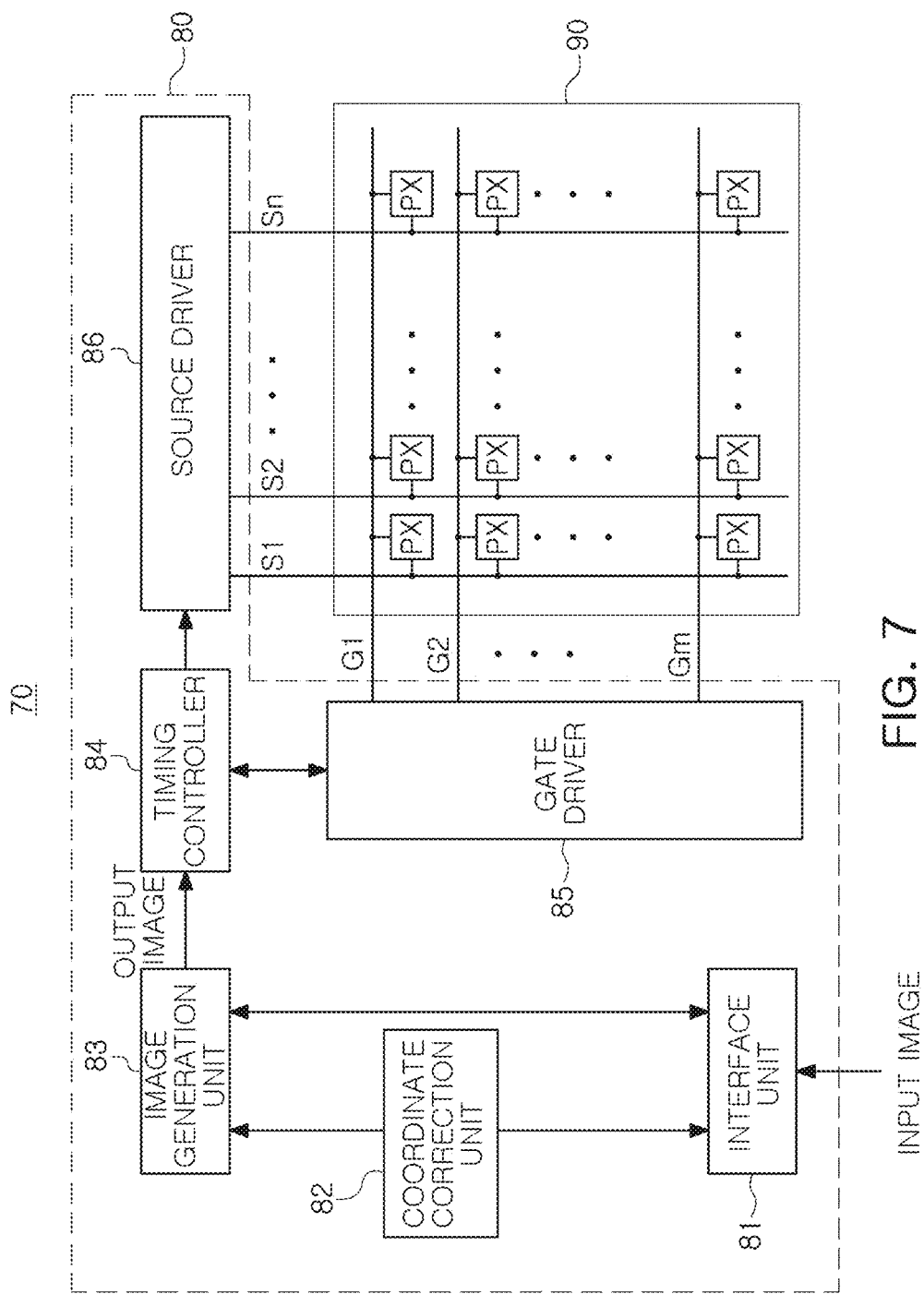
FIG. 7 is a schematic block diagram of a display device including a display driver according to at least one example embodiment of the inventive concepts.

FIG. 7 is a view of a display device including a display driver according to at least one example embodiment of the inventive concepts.

With reference to FIG. 7, a display device 70 according to at least one example embodiment of the inventive concepts may include a display driver 80 and a display panel 90. The display panel 90 may include a plurality of pixels PX arranged in a plurality of rows and columns.

The display driver 80 may input image data to each of the plurality of pixels PX through a plurality of gate lines GL1 to GLm and a plurality of source lines SL1 to SLn. According to at least one example embodiment, a gate driver 85 of the display driver 80 may sequentially scan the plurality of gate lines GL1-GLm. A source driver 86 may input image data to pixels PX included in a gate line scanned by the gate driver 85. According to at least one example embodiment, the image data input to pixels by the source driver 86 may be provided as a source voltage. An operation of the gate driver 85 and the source driver 86 may be controlled by a timing controller 84.

The display driver 80 according to at least one example embodiment of the inventive concepts may include an interface unit 81, a coordinate correction unit 82, and an image generation unit 83. The interface unit 81 may be connected to a graphics processing unit, an AP, a storage device, or the like, on an exterior thereof, to receive an input image. According to at least one example embodiment, the interface unit 81 may receive the input image through a serial communications protocol, such as mobile industry processor interface (MIPI). The input image may be provided as an original image to provide a VR experience, or as an image generated by modifying the original image. The interface unit 81 may be embodied by, for example, a circuit or circuitry. The interface unit 81 may be implemented in accordance with known structures of interfaces for interconnecting electronic components of an electronic device. The interface unit 81 may also be occasionally referred to in the present disclosure as the interface circuit 81.

A coordinate correction unit 82 and the image generation unit 83 may generate an output image using the input image received by the interface unit 81. According to at least one example embodiment, the coordinate correction unit 82 may adjust original coordinates of respective pixels included in the input image, thereby generating corrected coordinates. The image generation unit 83 may store at least a portion of the input image received by the interface unit 81 and may intentionally distort the input image using the corrected coordinates generated by the coordinate correction unit 82.

In a case in which the display device 70 is applied to a VR device, an image output by the display device 70 may be visible to a user through the lens of the VR device. Chromatic aberration and/or radial distortion may occur in a process in which an image passes through the lens. According to at least one example embodiment, the coordinate correction unit 82 and the image generation unit 83 may intentionally distort the input image to transmit the output image to the timing controller 84, thereby offsetting chromatic aberration and/or radial distortion, occurring in the lens.

According to at least one example embodiment of the inventive concepts, any or both of the coordinate correction unit 82 and the image generation unit 83 may include or be implemented by one or more circuits or circuitry (e.g., hardware) specifically structured to carry out and/or control some or all of the operations described in the present disclosure as being performed by any or both of the coordinate correction unit 82 and the image generation unit 83 (or an element thereof). According to at least one example embodiment of the inventive concepts, any or both of the coordinate correction unit 82 and the image generation unit 83 may include or be implemented by a memory and one or more processors executing computer-readable code (e.g., software and/or firmware) that is stored in the memory and includes instructions for causing the one or more processors to carry out and/or control some or all of the operations described herein as being performed by any or both of the coordinate correction unit 82 and the image generation unit 83 (or an element thereof). According to at least one example embodiment of the inventive concepts, any or both of the coordinate correction unit 82 and the image generation unit 83 may be implemented by, for example, a combination of the above-referenced hardware and one or more processors executing computer-readable code. The coordinate correction unit 82 and the image generation unit 83 may also be occasionally referred to in the present disclosure as the coordinate correction circuit 82 and the image generation circuit 83, respectively.

Figure 8:
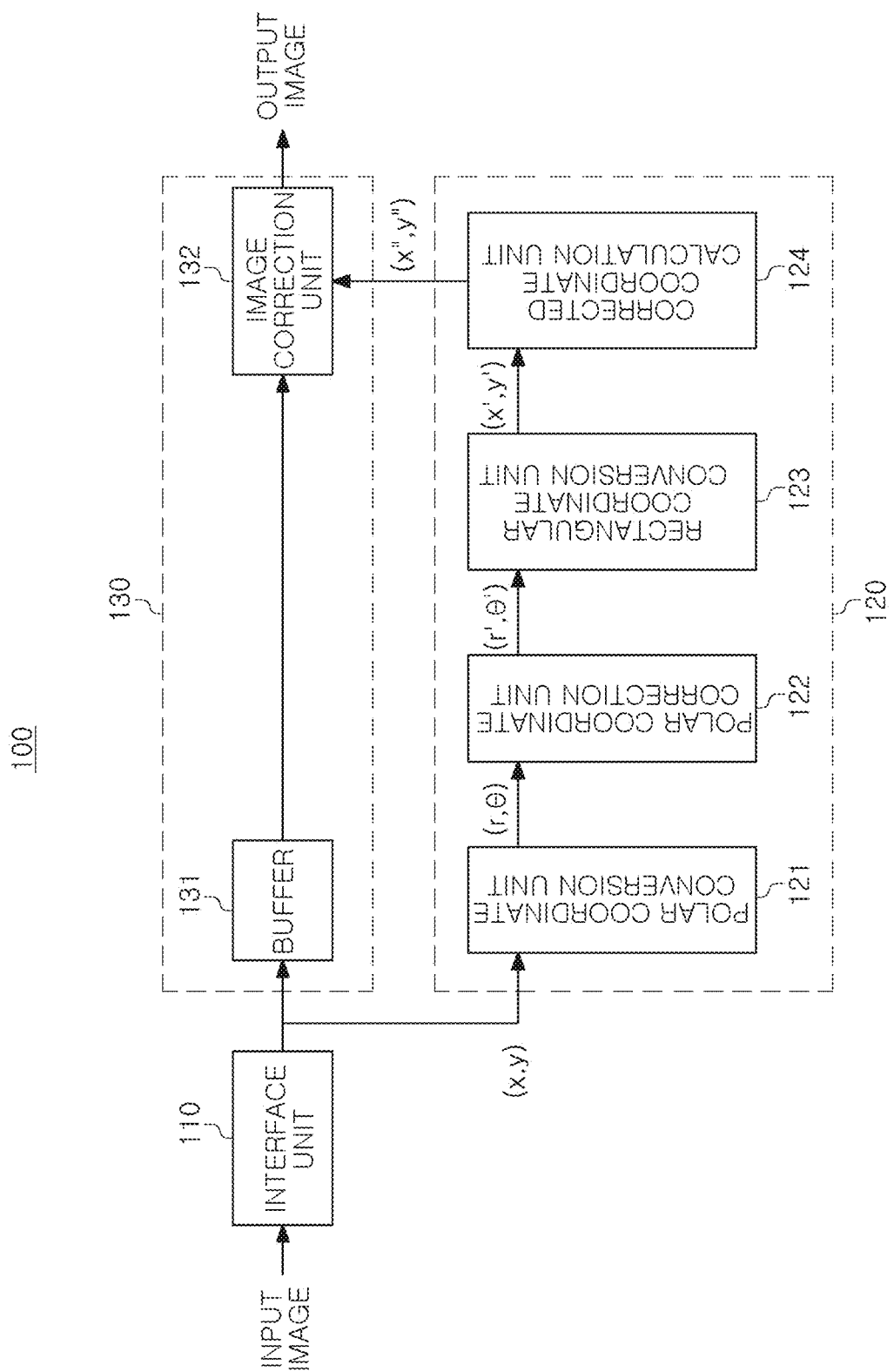
FIG. 8 is a schematic block diagram of a display driver according to at least one example embodiment of the inventive concepts.

Example structures of the coordinate correction unit 82 and the image generation unit 83, according to at least some example embodiments, are respectively illustrated by a coordinate correction unit 120 and image generation unit 130 of FIG. 8. FIG. 8 is discussed in greater detail below.

FIG. 8 is a schematic block diagram of a display driver according to at least one example embodiment of the inventive concepts.

With reference to FIG. 8, a display driver 100 according to at least one example embodiment of the inventive concepts may include an interface unit 110 receiving an input image, a coordinate correction unit 120 adjusting coordinates of pixels included in the input image, and an image generation unit 130 generating an output image. The interface unit 110 may receive the input image from an AP, a GPU, a memory, or the like, through an interface, such as MIPI. The input image may be provided as a VR image including a left eye image and a right eye image, respectively, visible to a left eye and a right eye of a user in the VR device, or as a monocular image, such as an original image. According to at least one example embodiment, the input image may be provided as an image generated by lowering resolution of the original image. In addition, the input image may include a first region in which an image is, in actuality, displayed and a second region surrounding the first region and displayed in black.

The coordinate correction unit 120 may adjust the coordinates of the pixels included in the input image so as to intentionally distort the input image to generate the output image. Hereinafter, an operation of the coordinate correction unit 120 will be described with reference to FIG. 9.

Figure 9:
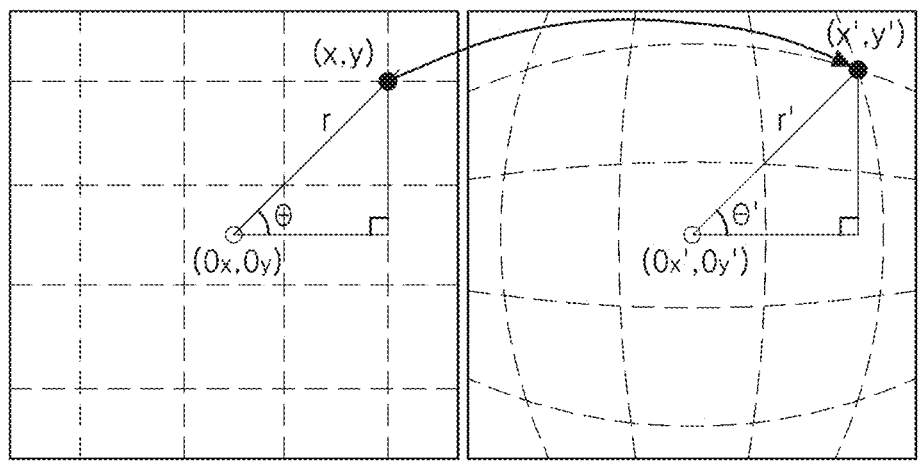
FIG. 9 is a view illustrating a method in which a display driver according to at least one example embodiment of the inventive concepts adjusts coordinates of pixels included in an image.

FIG. 9 is a view illustrating a method in which a display driver according to at least one example embodiment of the inventive concepts adjusts coordinates of pixels included in an image. In an example embodiment illustrated in FIG. 9, an image on a left side may represent an image before a coordinate correction unit 120 adjusts the coordinates of the pixels. An image on a right side may represent an image after the coordinates of the pixels are adjusted.

The coordinates of the pixels included in the input image received by the interface unit 110 may be extracted to be first rectangular coordinates (x, y) based on a central portion (Ox, Oy) of the input image. According to at least one example embodiment, a polar coordinate conversion unit 121 may convert the first rectangular coordinates (x, y) into first polar coordinates (r, θ) based on the central portion (Ox, Oy) of the input image. A relationship between the first polar coordinates (r, θ) and the first rectangular coordinates (x, y) may be expressed using Formula 1 below.

$$r = \sqrt{(x - Ox)^2 + (y - Oy)^2}$$
$$\theta = \arctan\left(\frac{x = ar}{y = ar}\right)$$
[Formula 1]

A polar coordinate correction unit 122 may adjust the first polar coordinates (r, θ) to generate second polar coordinates (r', θ'). According to at least one example embodiment, the polar coordinate correction unit 122 may only adjust a radius value r of the first polar coordinates (r, θ) to generate the second polar coordinates (r', θ'). In other words, an angle θ of the first polar coordinates (r, θ) and an angle θ' of the second polar coordinates (r', θ') may be equal.

The coordinate correction unit 120 and an image generation unit 130 may intentionally distort the input image to generate an output image so that radial distortion and chromatic aberration occurring in a lens of a VR device may be reduced or, alternatively, minimized. Radial distortion and chromatic aberration may occur while a distance between respective pixels and a central portion of an image is changed. Therefore, only a radius value r of the first polar coordinates (r, θ) corresponding to coordinates of the pixels included in the input image may be adjusted to generate the second polar coordinates (r', θ'), thereby reducing or, alternatively, minimizing radial distortion and chromatic aberration occurring in the lens. According to at least one example embodiment, the radius value r of the second polar coordinates (r', θ') may be determined by Formula 2 below. In Formula 2 below, each of k1 and k2 may be provided as a value determined by characteristics of the lens included in the VR device, such as curvature, a radius, and a focal length of the lens.

$$r' = r(1 + k_1 r^2 + k_2 r^4)$$
[Formula 2]

A rectangular coordinate conversion unit 123 may convert the second polar coordinates (r', θ') into the second rectangular coordinates (x', y'). A relationship between the second rectangular coordinates (x', y') and the second polar coordinates (r, θ') may be expressed using Formula 3 below. In addition, a relationship between the first rectangular coordinates (x, y) and the second rectangular coordinates (x', y') may be expressed using Formula 4. (Ox', Oy') may be provided as coordinates corresponding to the central portion of the image after coordinates are adjusted in the coordinate correction unit 120 and may be the same as (Ox, Oy).

$$r' = \sqrt{(x' - Ox')^2 + (y' - Oy')^2}$$
$$\theta' = \arctan\left(\frac{x' = \mathrm{arc}}{y' = \mathrm{arc}}\right)$$
[Formula 3]

$$x' = Ox' + r'\cos\theta$$
$$y' = Oy' + r'\sin\theta$$
[Formula 4]

In a manner different from the first rectangular coordinates (x, y) having an integer value, the second rectangular coordinates (x', y') may have a non-integer value. Therefore, in a case in which the input image is distorted using the second rectangular coordinates (x', y'), an error may occur in a process of generating the output image. According to at least one example embodiment, a corrected coordinate operation unit 124 may be provided to solve a problem described above. The corrected coordinate operation unit 124 may interpolate the second rectangular coordinates (x', y') to generate corrected coordinates (x", y"). The corrected coordinates (x", y") may have an integer value.

The image generation unit 130 may generate the output image using the corrected coordinates (x", y") output by the coordinate correction unit 120. The image generation unit 130 may include a buffer 131 and an image correction unit 132, while the buffer 131 may store a portion of the input image. According to at least one example embodiment, the buffer 131 may include a plurality of line memories storing the input image in line units. For example, each of the plurality of line memories may store a single row of the input image or a single column of the input image. The number of line memories used in the buffer 131 may be determined by a degree to which coordinates are adjusted by the coordinate correction unit 120. According to at least one example embodiment, the number of line memories used may vary depending on a difference between the radius value of the first polar coordinates (r, θ) and the radius value of the second polar coordinates (r', θ').

An image correction unit 132 may combine data of the input image temporarily stored in the buffer 131 with the corrected coordinates (x", y") to generate the output image. According to at least one example embodiment, the image correction unit 132 may combine the data of the input image with the corrected coordinates (x", y") in pixel units to generate the output image. Thus, the image correction unit 132 may process the input image using an on-the-fly method. Data of the output image generated by the image correction unit 132 may be output in pixel units to be stored in a latch included in the source driver, or the like.

Figure 10:
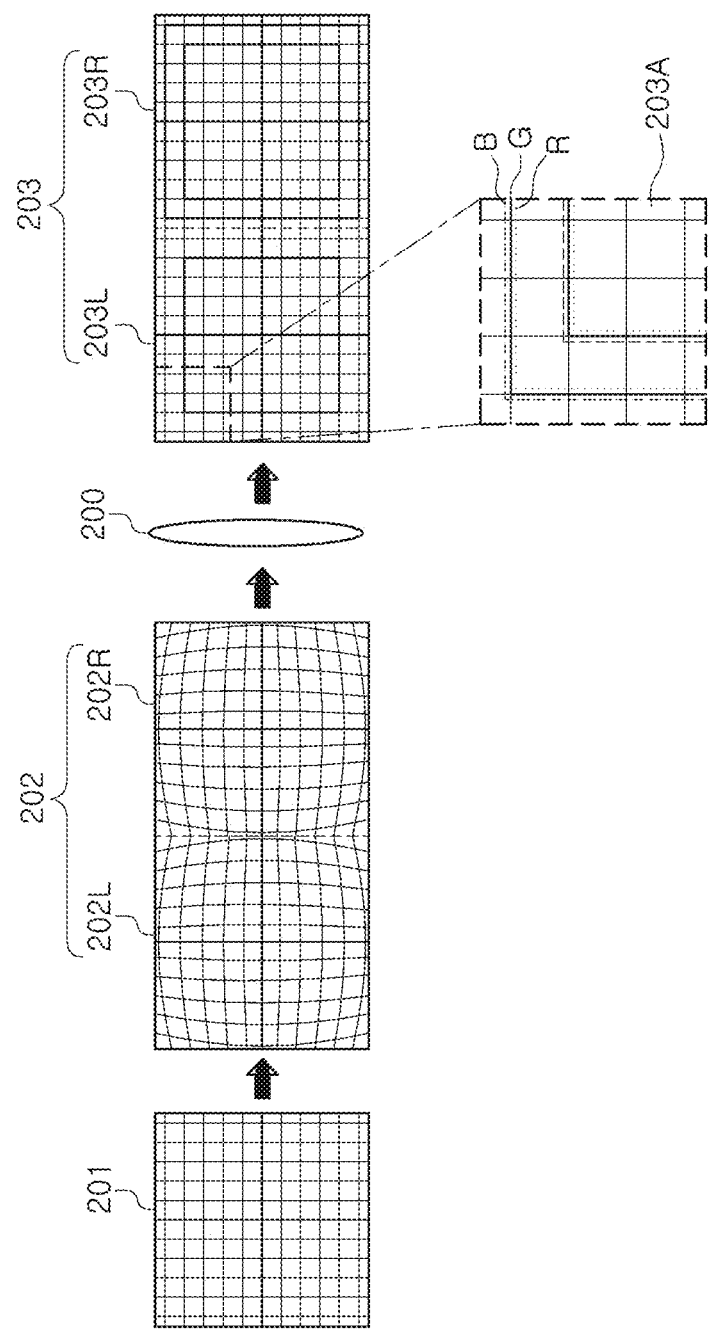
FIGS. 10 and 11 are views illustrating an operation of a display driver according to at least one example embodiment of the inventive concepts.
Figure 11:
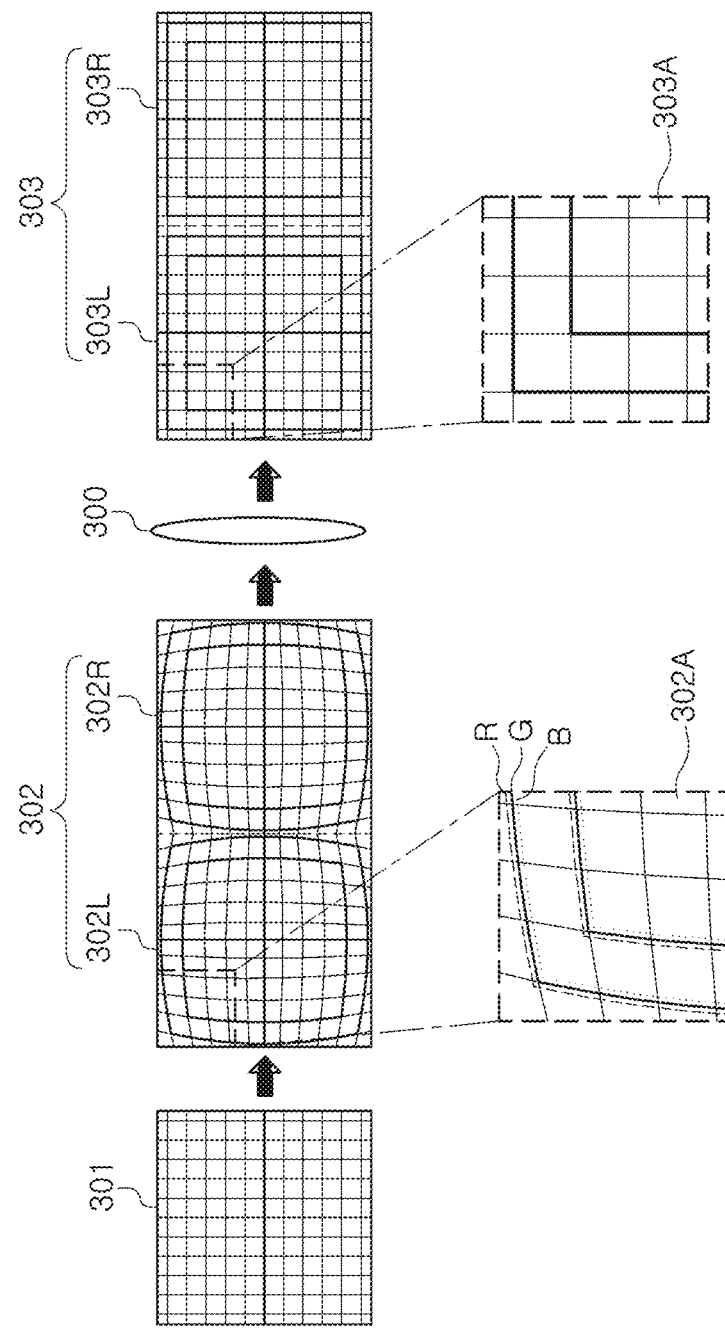

FIGS. 10 and 11 are views illustrating an operation of a display driver according to at least one example embodiment of the inventive concepts. In example embodiments illustrated in FIGS. 10 and 11, an input image received by the display driver may be provided as a monocular image not including a left eye image and a right eye image for the sake of a VR experience.

With reference to FIG. 10, the display driver according to at least one example embodiment of the inventive concepts may intentionally distort an input image 201 to generate an output image 202. The output image 202 may include a left eye image 202L and a right eye image 202R, respectively, visible to a left eye and a right eye of a user using a VR device. In an example embodiment illustrated in FIG. 10, a case in which pincushion distortion occurs in a lens 200 included in the VR device is taken as an example. The display driver may generate the output image 202 by barrel distortion of the input image 201 to compensate for the pincushion distortion in advance.

The display driver may generate the output image 202 by barrel distortion of the input image 201 in advance, so that radial distortion may not occur in a VR image 203 visible to eyes of the user, as illustrated in FIG. 10. However, due to chromatic aberration occurring in the lens 200, data of a red channel, data of a green channel, and data of a blue channel may be displayed separately from each other on respective pixels, as illustrated in an enlarged region 203A of the VR image 203.

According to at least one example embodiment, with reference to a left eye VR image 203L, the data of the red channel included in a relatively long wavelength band may be displayed closer to a central portion of the left eye VR image 203L than is the data of the green channel. The data of the blue channel included in a relatively short wavelength band may be displayed farther from the central portion of the left eye VR image 203L than is the data of the green channel. In other words, a phenomenon in which data of respective color channels is displayed separately on respective single pixels due to chromatic aberration of the lens 200 may be displayed as a change in a radius value of polar coordinates defined based on a central portion of each of the left eye VR image 203L and the right eye VR image 203R.

With reference to FIG. 11, the display driver according to at least one example embodiment of the inventive concepts may distort an input image 301 in consideration of radial distortion and chromatic aberration together, expected to occur in a lens 300, to generate an output image 302. The display driver may offset pincushion distortion expected to occur in the lens 300 in advance by barrel distortion of the input image 301. In addition, the display driver may distort the input image 301 such that data of respective color channels of the input image 301 may be displayed separately on respective pixels. Thus, the user may view an image in which distortion is reduced or, alternatively, minimized in the VR image 303. As is illustrated in FIG. 11, the VR image 303 includes a right eye image 303R and a left eye image 303L, a portion of which is further illustrated as enlarged region 303A.

With reference to the enlarged region 302A illustrating a portion of the left eye image 302L in the output image 302 in FIG. 11, data of respective color channels may be displayed separately on at least a portion of pixels of the output image 302. In this case, in consideration of chromatic aberration of the lens 300 in which data of a color channel having a relatively short wavelength is displayed farther from a central portion thereof, the display driver may generate the output image 302 such that data of a color channel having a relatively long wavelength is displayed father from a central portion of the output image 302 in respective pixels.

As described above, an entirety of radial distortion and chromatic aberration, occurring in the lens 300 may be displayed as a changed in distance between respective pixels and a central portion of each of the left eye image 302L and the right eye image 302R, incident on the lens 300. Therefore, the display driver may convert coordinates of respective pixels included in the input image 301 into polar coordinates and adjust a radius value of the polar coordinates, thereby simultaneously compensating for radial distortion and chromatic aberration, occurring in the lens 300. In this case, in order to compensate for chromatic aberration, a process of separating data included in the input image 301 from each of the red channel, the green channel, and the blue channel may further be required.

Figure 12:
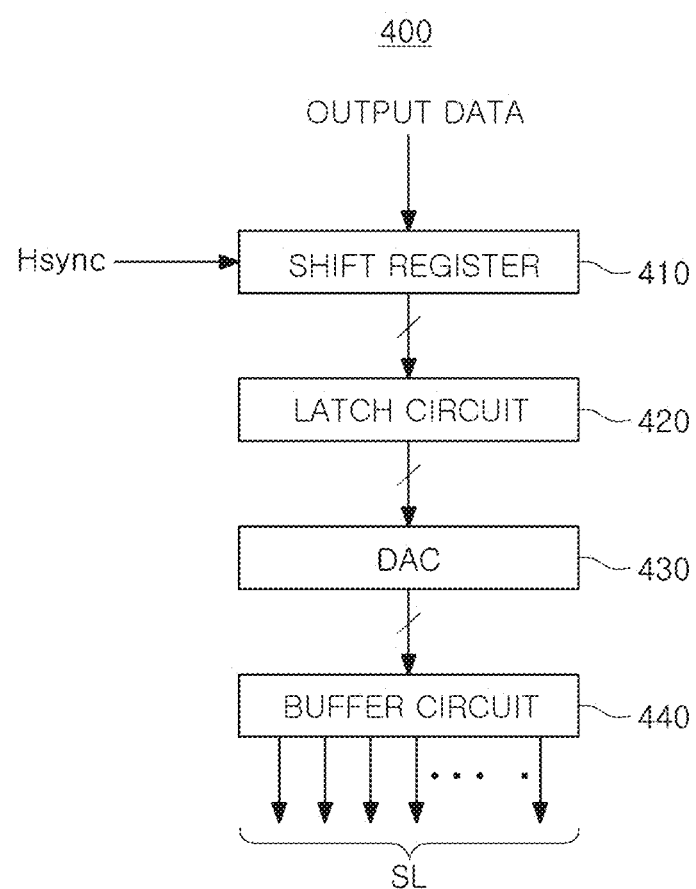
FIG. 12 is a schematic view of a source driver included in a display driver according to at least one example embodiment of the inventive concepts.

FIG. 12 is a schematic view of a source driver included in a display driver according to at least one example embodiment of the inventive concepts.

With reference to FIG. 12, a source driver 400 according to at least one example embodiment of the inventive concepts may include a shift register 410, a latch circuit 420, a digital-to-analog converter (DAC) 430, a buffer circuit 440, and the like. According to at least one example embodiment, the latch circuit 420 may include a sampling circuit sampling data and a holding latch storing data sampled by the sampling circuit. Respective components 410 to 440 included in the source driver 400 are not limited to an example embodiment illustrated in FIG. 12 and may be variously modified to have other forms.

The shift register 410 may control operation timing of each of a plurality of sampling circuits included in the latch circuit 420 in response to a horizontal sync signal (Hsync). The Hsync may be provided as a signal having a desired or, alternatively, predetermined period. The latch circuit 420 may sample and store output data in a shift order of the shift register 410. The output data may be provided as data corresponding to a single row or column of an output image to be displayed on a display panel. The latch circuit 420 may output the output data to the DAC 430.

The DAC 430 may convert digital image data into a source voltage. According to at least one example embodiment, the source voltage generated by the DAC 430 may be output to a plurality of source lines SL via the buffer circuit 440. The source voltage output to the plurality of source lines SL may be input to a pixel connected to a gate line scanned by the gate driver.

The display driver according to at least one example embodiment of the inventive concepts may not display an original image corresponding to an image to be displayed on the display panel, but may distort the original image to generate an output image to be displayed on the display panel. According to at least one example embodiment, the display driver according to at least one example embodiment of the inventive concepts may generate the output image from the original image using an on-the-fly method without a frame memory storing the original image in frame units and may transmit the output image to the source driver 400. Therefore, a method of securing an operation time to generate an output image by distorting the original image may be required. Hereinafter, descriptions thereof will be provided with reference to FIGS. 13 and 14.

Figure 13:
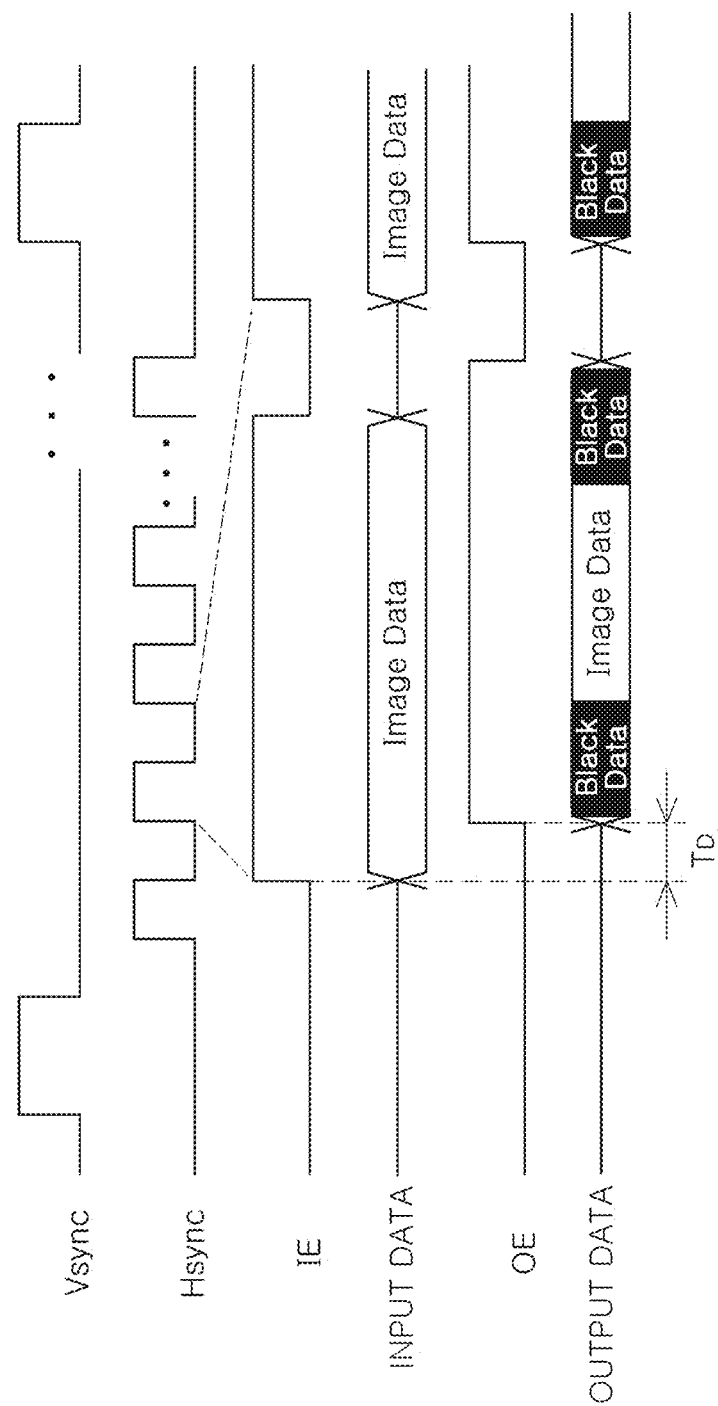
FIGS. 13 and 14 are views illustrating an operation of a display driver according to at least one example embodiment of the inventive concepts.
Figure 14:
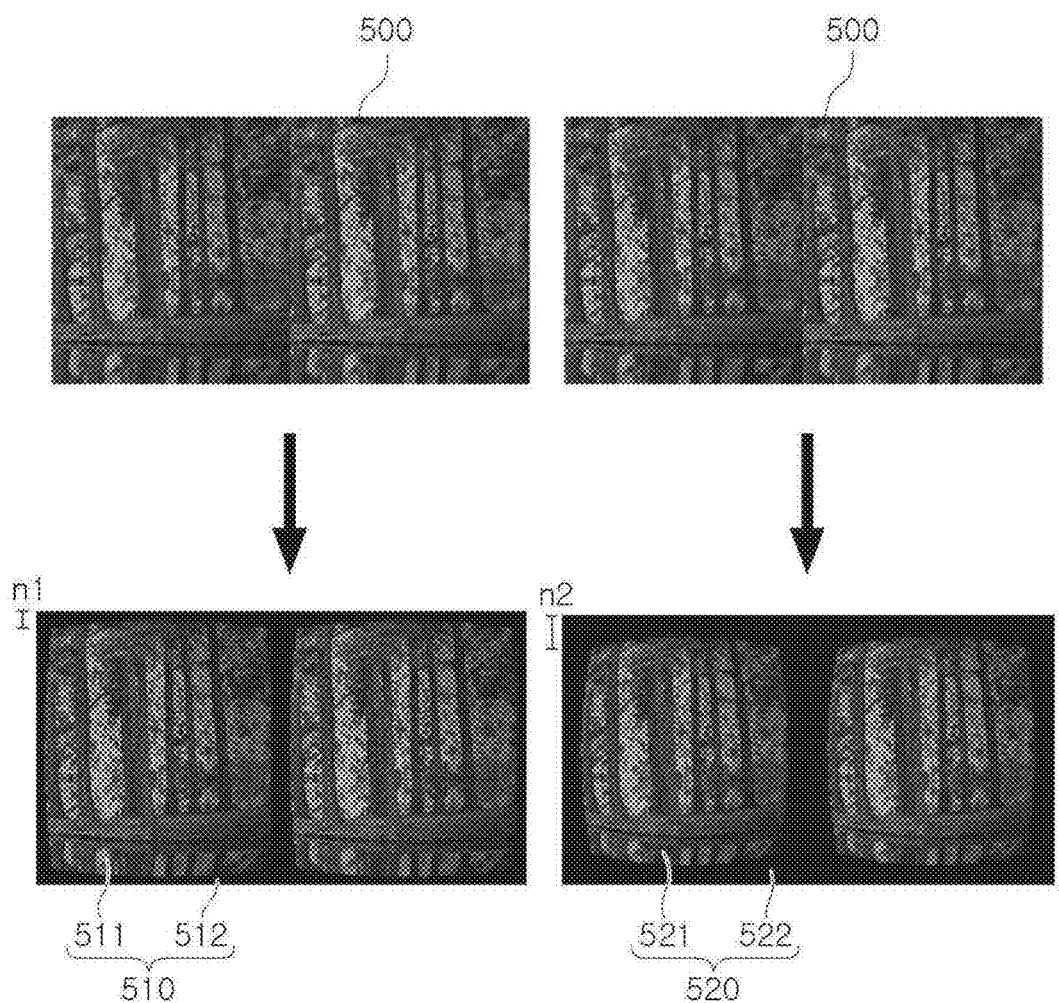

FIGS. 13 and 14 are views illustrating an operation of a display driver according to at least one example embodiment of the inventive concepts.

FIG. 13 may be a timing diagram illustrating an operation of the display driver according to at least one example embodiment of the inventive concepts. With reference to FIG. 13, a plurality of gate lines included in a display panel may be sequentially scanned during a single period of a vertical sync signal (Vsync). Time at which each of the plurality of gate lines is scanned may be defined as a Hsync. According to at least some example embodiments, the Vsync and Hsync synchronization signals may be generated by a timing controller of a display device (e.g., the timing controller 84 of the display device 70 illustrated in FIG. 7.).

In an example embodiment illustrated in FIG. 13, while an input enable signal IE is being activated within a single period of the Hsync, the display driver may receive input data corresponding to at least a portion of the input image, through an interface unit. According to at least one example embodiment, while the input enable signal IE is being activated within a single period of the Hsync, the display driver may receive image data corresponding to a single line of the input image. The input image received by the display driver may only include the image data.

In the meantime, while an output enable signal (OE) is being activated, the display driver may output data to the display panel. With reference to FIG. 13, a rising edge of the OE and a rising edge of the IE may be different by a desired or, alternatively, predetermined delay time TD. The delay time TD may be provided as time required for the display driver to generate corrected coordinates using original coordinates of pixels included in input data using an on-the-fly method.

A coordinate correction unit included in the display driver may convert at least a portion of original coordinates of pixels included in the input data into the corrected coordinates during the delay time TD. An image generation unit included in the display driver may distort the input data using the corrected coordinates generated by the coordinate correction unit, thereby generating output data. According to at least one example embodiment, the output data generated by distorting the input data may include first output data, second output data, and third output data, sequentially output in a single row or in a single column.

According to at least one example embodiment, the first output data and the third output data may be provided as black data, while the second output data may be provided as image data. A frame of image output during a single period of the Vsync may include a first region in which actual image data included in the input image is distorted to be displayed and a second region surrounding the first region to be displayed in black, by the black data output before and after the image data. For example, the second region may be displayed based on the first output data and the third output data, and the first region may be displayed based on the second output data. In this case, the number of line memories, in actuality, used in a buffer of the display driver may be determined depending on a size of the black data.

With reference to FIG. 14, sizes of the first regions (511 and 521) and the second regions (512 and 522), displayed in output images 510 and 520 may vary depending on a degree of distortion of an input image 500. A first output image 510 may have a second region 512 having a size less than that of a second region 522 of a second output image 520. The display driver according to at least one example embodiment of the inventive concepts may allow the degree of distortion of the input image 500 to be different in consideration of characteristics of a lens provided in a VR device, thereby generating the first output image 510 or the second output image 520.

With reference to FIG. 14, the second output image 520 may include the second region 522 larger than the second region 512 of the first output image 510. Therefore, it can be understood that, in the lens of the VR device providing a VR experience using the second output image 520, greater radial distortion and/or chromatic aberration may occur.

The display driver generating the second output image 520 by distorting the input image 500 may store the input image 500 in a larger number of line memories than those when the first output image 510 is generated. According to at least one example embodiment, the display driver may store a portion of the input image 500 using n1 line memories when the first output image 510 is generated, while, when the second output image 520 is generated, the display driver may store a portion of the input image 500 using n2 line memories, where n1 is a number and n2 is a number greater than n1.

Figure 15:
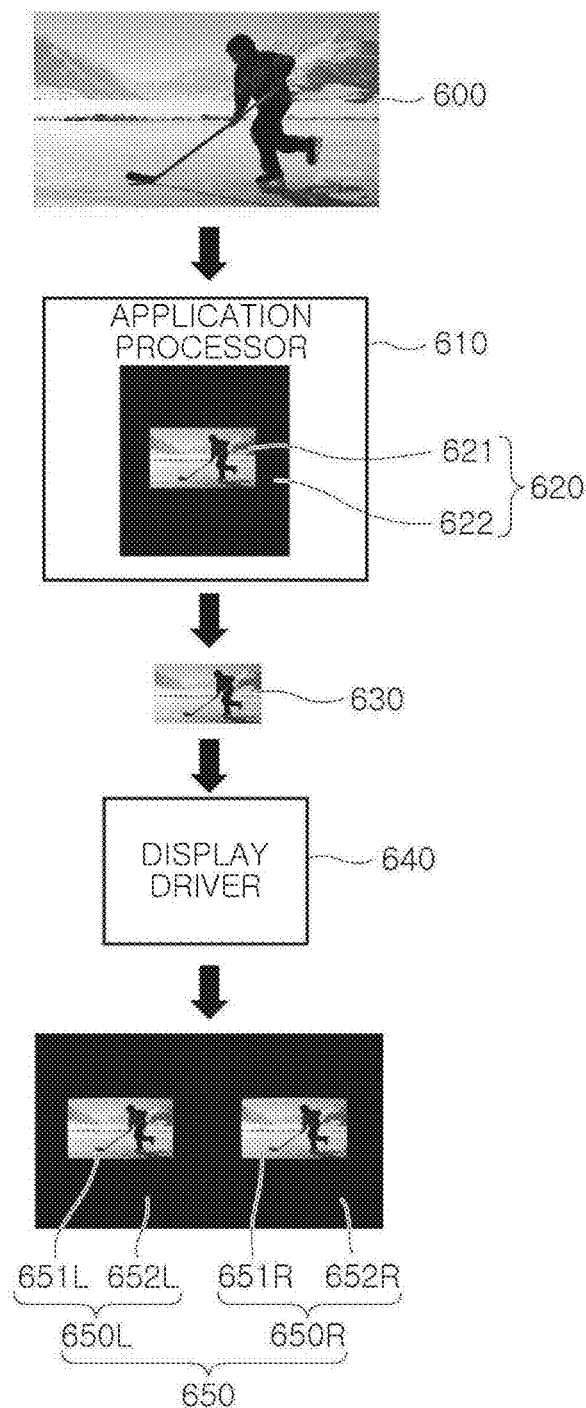
FIGS. 15 and 16 are views illustrating an operation of a display driver according to at least one example embodiment of the inventive concepts.
Figure 16:
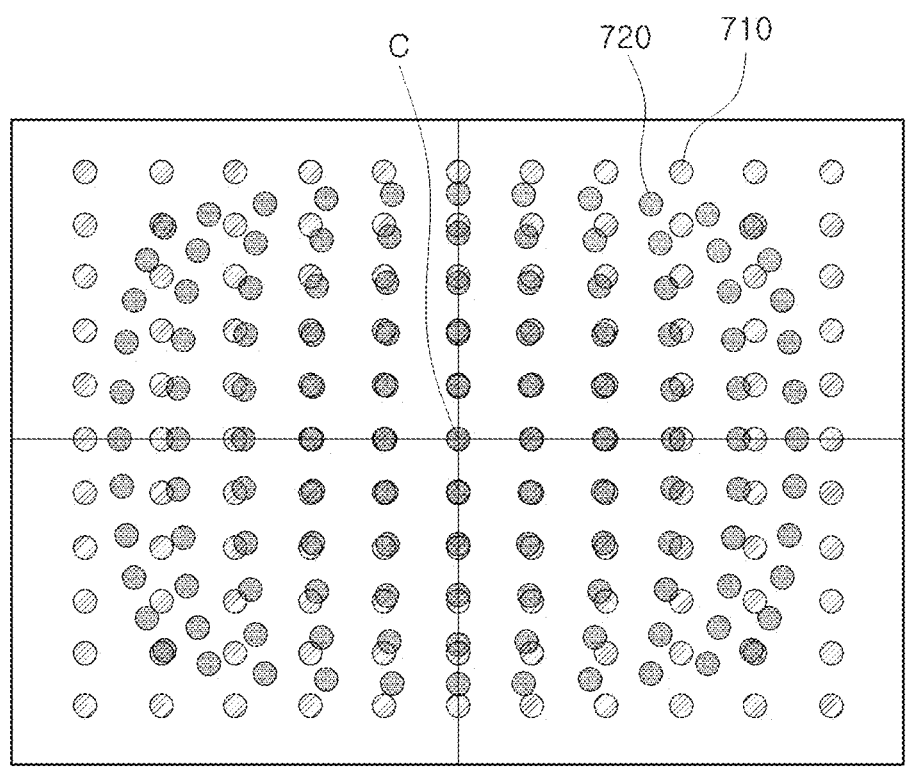

FIGS. 15 and 16 are views illustrating an operation of a display driver according to at least one example embodiment of the inventive concepts.

With reference to FIG. 15, according to at least one example embodiment, an AP 610 may edit a source image 600, thereby generating a corrected image 620. The corrected image 620 may include an active region 621 in which an original image 600 is, in actuality, displayed and an inactive region 622 displayed in black. According to at least one example embodiment, the AP may generate the active region 621 by lowering resolution or and reducing a size of the original image 600 and may generate the corrected image 620 by generating the inactive region on a periphery of the active region 621. According to at least one example embodiment, the corrected image 620 may have a size equal to that of a left image or a right image of a VR image finally output through a lens of a VR device.

According to at least one example embodiment, the AP 610 may generate the corrected image 620 and then only transmit the active region 621 to a display driver 640 as an input image 630. Therefore, a transmission speed between the AP 610 and the display driver 640 may be increased, and power consumption may be reduced, as compared with a case in which the original image 600 is transmitted to the display driver 640 without an additional process, or by lowering the resolution of and reducing the size of the original image 600 and without a process of generating the corrected image 620.

The display driver 640 may generate an output image 650 to provide a VR experience, using the input image 630. The output image 650 may include a left eye output image 650L visible to a left eye of a user wearing the VR device and a right eye output image 650R visible to a right eye of the user. Each of the left eye output image 650L and the right eye output image 650R may include first regions 651L and 651R in which an image is, in actuality, displayed and may include second regions 652L and 652R, surrounding the first regions 651L and 651R and displayed in black.

As described above, the display driver 640 may intentionally distort the input image 630, thereby generating the output image 650. The display driver 640 may convert coordinates of pixels included in the input image 630 into polar coordinates and may change a radius value of polar coordinates. Through a process of adjusting the coordinates of pixels, described above, radial distortion and chromatic aberration generated by the lens through which the output image 650 passes may be compensated for.

According to at least one example embodiment, the display driver 640 may adjust an image process of a current frame with reference to an image process result of a previous frame of the input image 630. According to at least one example embodiment, the display driver 640 may find pixels in which coordinate adjustment is not required, with reference to the image process result of the previous frame so that computational quantity of an image process intentionally distorting the input image 630, as well as power consumption, may be reduced. Hereinafter, descriptions thereof will be provided with reference to FIG. 16.

With reference to FIG. 16, first coordinates 710 may be provided as coordinates of pixels included in the input image 630 received by the display driver 640. Second coordinates 720 may be provided as coordinates of pixels included in the output image 650 output by the display driver 640. In an example embodiment illustrated in FIG. 16, the second coordinates 720 may be generated by prediction of the occurrence of pincushion distortion in the lens of the VR device and barrel distortion of the first coordinates 710 of the input image 630 by the display driver 640, and the output image 650 may be generated based on the second coordinates 720. The display driver 640 may display the first coordinates 710 as polar coordinates based on a central portion C of the input image 630 and then adjust a radius value of each of the first coordinates 710 to generate the second coordinates 720.

With reference to FIG. 16, in the case of a portion of pixels disposed adjacent to the central portion C of the input image 630, the first coordinates 710 and the second coordinates 720 may have the same value. After barrel distortion of the input image 630 by the display driver 640, coordinates of the output image 650 and the input image 630 may be compared, thereby determining pixels in which the first coordinates 710 and the second coordinates 720 have the same value. According to at least one example embodiment, in the case of the display driver 640, a region including pixels in which the first coordinates 710 and the second coordinates 720 have the same value may be defined as an overlap region.

In a case in which the overlap region is defined in a specific frame of the input image 630, the display driver 640 may only perform an image process on pixels included in the remainder of region not including the overlap region, in terms of subsequent frames. According to at least one example embodiment, the display driver 640 may only adjust a radius value of polar coordinates of the pixels included in the remainder of region and may convert the polar coordinates into rectangular coordinates again. In subsequent, an interpolation procedure to remove a decimal point may be performed. Thus, computational quantity that the display driver 640 should process when the image process is performed may be reduced, and consequently, an increase in power consumption of the display driver 640 may be reduced or, alternatively, minimized.

As set forth above, according to at least some example embodiments of the inventive concepts, a display driver may intentionally distort an input image, thereby reducing or, alternatively, minimizing distortion occurring in a lens of a virtual reality (VR) device. In addition, a VR device may be implemented, and power consumption may be reduced using a relatively low-priced application processor (AP) and graphics processing unit (GPU) in such a manner that a process intentionally distorting an input image in a display driver, rather than in the AP or the GPU, is performed.

Example embodiments of the inventive concepts having thus been described, it will be obvious that the same may be varied in many ways. Such variations are not to be regarded as a departure from the intended spirit and scope of example embodiments of the inventive concepts, and all such modifications as would be obvious to one skilled in the art are intended to be included within the scope of the following claims.

What is claimed is:
1. A display driver, comprising:
an interface circuit configured to receive an input image of a virtual reality (VR) experience from at least one of an application processor (AP) and a graphics processing unit (GPU);
a coordinate correction circuit configured to generate corrected coordinates by adjusting input coordinates of pixels included in the input image; and
an image generation circuit configured to generate an output image by distorting the input image using the corrected coordinates.
2. The display driver of claim 1, wherein,
the image generation circuit includes a buffer configured to store at least a portion of the input image, and
the image generation circuit is configured to distort the at least a portion of the input image stored in the buffer using the corrected coordinates.
3. The display driver of claim 2, wherein the buffer comprises a plurality of line memories configured to store data in a single row of the input image or data in a single column of the input image.
4. The display driver of claim 2, wherein the image generation circuit is configured such that the output image includes,
a first region in which the input image is distorted to be displayed, and
a second region surrounding the first region and displayed in black.
5. The display driver of claim 4, wherein data amount of the at least a portion of the input image stored in the buffer is determined depending on a size of the second region.
6. The display driver of claim 1,
wherein the coordinate correction circuit is configured to,
convert first rectangular coordinates corresponding to the input coordinates into polar coordinates based on a central portion of the input image to generate first polar coordinates;
adjust the first polar coordinates to generate second polar coordinates;
convert the second polar coordinates into rectangular coordinates to generate second rectangular coordinates; and
generate the corrected coordinates using the second rectangular coordinates.

7. The display driver of claim 6, wherein the coordinate correction circuit is configured to generate the second polar coordinates by adjusting only a radius value of the first polar coordinates.

8. The display driver of claim 6, wherein the coordinate correction circuit is configured to reduce a radius value of the first polar coordinates corresponding to a red channel of the input image and increase the radius value of the first polar coordinates corresponding to a blue channel of the input image.

9. The display driver of claim 8, wherein the coordinate correction circuit is configured such that the coordinate correction circuit does not adjust the first polar coordinates corresponding to a green channel of the input image.

10. The display driver of claim 6, wherein the coordinate correction circuit is configured to apply barrel distortion to the input image by adjusting the first polar coordinates to generate the second polar coordinates.

11. The display driver of claim 6, wherein the coordinate correction circuit is configured to interpolate the second rectangular coordinates to generate the corrected coordinates including only an integer value.

12. The display driver of claim 1, wherein the coordinate correction circuit is configured to generate the corrected coordinates based on at least one of,
 a curvature of a lens through which the output image passes, and
 a focal length of the lens.

13. A display driver, comprising:
an interface circuit configured to receive an input image of a virtual reality (VR) experience in response to a first sync signal;
a source driver configured to input an output image, generated from the input image, to a display panel in response to a second sync signal, the first and second sync signals having a same period, the second sync signal being delayed by a first delay time, relative to the first sync signal; and
an image generation circuit configured to distort the input image during the first delay time to generate the output image, the output image including,
 a first region in which the input image is distorted to be displayed, and
 a second region that surrounds the first region and is to be displayed in black.

14. The display driver of claim 13, wherein,
the source driver is configured to sequentially input first output data, second output data, and third output data to the display panel during a single period of the second sync signal,
the first output data and the third output data correspond to the second region, and
the second output data corresponds to the first region.

15. The display driver of claim 14, wherein the first output data and the third output data are identical to each other.

16. The display driver of claim 14, wherein the first output data, the second output data, and the third output data are provided as data corresponding to a single row or column of the output image.

17. The display driver of claim 13, further comprising:
a timing controller,
the timing controller being configured to generate the first sync signal and the second sync signal such that a single period of the first sync signal and the second sync signal is as a time during which one of a plurality of gate lines included in the display panel is scanned.

18. The display driver of claim 13, wherein the image generation circuit is configured to generate the output image through radial distortion of the input image.

19. The display driver of claim 18, further comprising:
a buffer configured to store at least a portion of the input image,
wherein capacity of the at least a portion of the input image stored in the buffer is proportional to a degree of radial distortion of the input image by the image generation circuit.

20. A mobile electronic device, comprising:
an application processor (AP) configured to generate an input image to provide a virtual reality (VR) experience;
at least one lens configured to be located adjacent to eyes of a user, when a user uses the mobile electronic device to experience the VR experience;
a display driver configured to generate an output image through radial distortion of the input image to correct chromatic aberration and pincushion distortion caused by the lens; and
a display device including a display panel configured to receive the output image from the display driver and to display the output image.

* * * * *